No. 851,403. PATENTED APR. 23, 1907.
A. M. CORNELIUS & W. V. CHAMPLIN.
ELECTRIC LIGHTING DEVICE.
APPLICATION FILED JAN. 12, 1907.
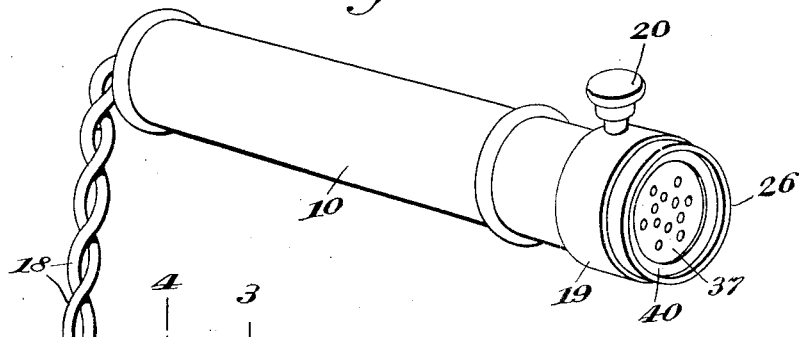
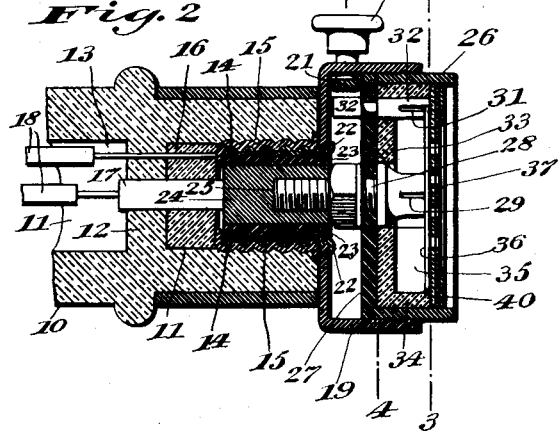
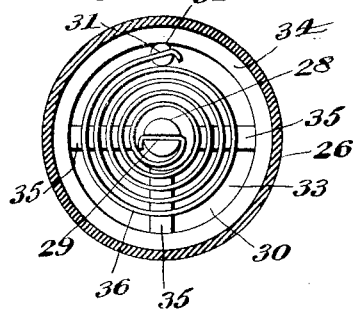
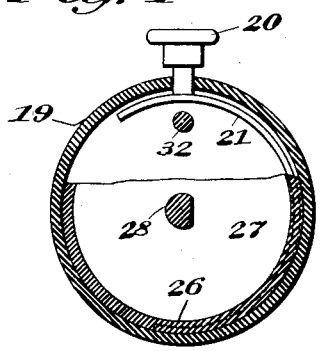
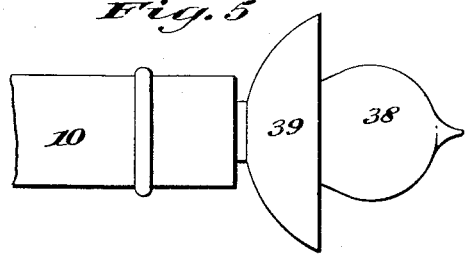
Witnesses
Inventors
Antone M. Cornelius and
Willoughby V. Champlin
By Chas. C. Tillman
Attorney.

UNITED STATES PATENT OFFICE.

ANTONE M. CORNELIUS, OF CHICAGO, ILLINOIS, AND WILLOUGHBY V. CHAMPLIN, OF ROCHESTER, NEW YORK, ASSIGNORS TO ABET MANUFACTURING COMPANY, OF CHICAGO, ILLINOIS, A CORPORATION OF ILLINOIS.

ELECTRIC-LIGHTING DEVICE.

No. 851,403.   Specification of Letters Patent.   Patented April 23, 1907.

Application filed January 12, 1907. Serial No. 352,008.

*To all whom it may concern:*

Be it known that we, ANTONE M. CORNELIUS and WILLOUGHBY V. CHAMPLIN, citizens of the United States, residing at Chicago, in the county of Cook and State of Illinois, and Rochester, in the county of Monroe and State of New York, respectively, have invented certain new and useful Improvements in an Electric-Lighting Device, of which the following is a specification.

This invention relates to improvements in a device which is adapted for use either as an electric lamp or as a cigar lighter, or in other words, to a convertible electric lamp or cigar lighter, and while it is more especially intended to be used in connection with automobiles for furnishing a light for the purpose of examining the mechanism of the machine in case of repairs or adjustment of its parts, and to enable a smoker to light a cigar while the automobile is in rapid motion or otherwise, yet it is applicable for use as a cigar lighter on the counters of cigar stores or other places, and as a portable electric lamp to be used for any desired purpose and in any suitable connection; and it consists in certain peculiarities of the construction, novel arrangement, and operation of the various parts thereof, as will be hereinafter more fully set forth and specifically claimed.

The principal object of our invention is to provide a device which can be readily converted from an electric lamp into a cigar lighter, or vice versa, which shall be simple and inexpensive in construction, strong, durable and effective in operation, and so made that its parts may be readily assembled for use either as an illuminant or lamp, or as an igniting device for cigars and the like.

Other objects and advantages of the invention will be disclosed in the subjoined description and explanation.

In order to enable others skilled in the art to which our invention pertains, to make and use the same, we will now proceed to describe it, referring to the accompanying drawing, in which—

Figure 1 is a perspective view of a lighting device embodying our invention, showing its parts arranged for use as a cigar lighter. Fig. 2 is a greatly enlarged axial sectional view through the front portion of the device. Fig. 3 is a cross-sectional view taken on line 3—3 of Fig. 2. Fig. 4 is a similar view taken on line 4—4 of Fig. 2; and Fig. 5 is a view in side elevation of the front portion of the device, showing an electric lamp provided with a reflector connected thereto.

Like numerals of reference, refer to corresponding parts throughout the different views of the drawing.

The reference numeral 10 designates the body or hand piece of the lighting device, which may be made of any suitable size, form and material, but preferably cylindrical in shape and of wood or hard rubber. This body or hand piece is provided with a longitudinal bore 11, which is divided near its front end by means of a transverse partition 12, thus forming two compartments 13 and 14 of the bore for the reception and operation of the various parts of the device, as will be hereinafter explained. Located in the compartment 14 of the bore 11 is an internal screw-threaded metallic socket 15 which rests at its inner end on a suitable block or plug 16 interposed between said socket and the front surface of the partition 12, as is clearly shown in Fig. 2 of the drawing. This plug and the partition 12 are apertured for the reception of a terminal 17, to one end of which is connected one of the conductors 18 which are extended through the rear end of the hand piece 10 forwardly, and are connected at their other ends to a battery or other source of electric supply. The other conductor 18 is also extended through suitable openings in the partition 12 and block or plug 16 so as to contact or be electrically connected at its front end with the metallic socket 15, as is clearly shown in Fig. 2 of the drawing.

Located in the socket 15 is a stem or stub shaft of a removable cup 19, which is provided in its wall with a push-button 20 to coact with a contact spring 21 which is located in the cup, as shown in Figs. 2 and 4 of the drawing. The stem of the cup 19 consists of an externally screw-threaded metallic portion 22, which is hollow and of suitable length to extend near the bottom of the socket 15 when screwed therein, and of insulating material 23, such as fiber, which is interposed between the screw-threaded extension 22 and a metallic rod 24, usually of brass, which rod has in its front end a screw-threaded socket 25, and its other or rear end exposed to contact with the terminal 17 to which one of the conductors is attached.

Removably located in the cup 19 is an igniter carrying cup 26, which has its front end open and its rear end closed by means of a disk or plate 27, of fiber or other suitable material, which plate or disk is centrally apertured for the reception of a screw-bolt or pin 28, which is flattened to prevent it turning in said disk when said pin or bolt is screwed into the socket 25 of the metallic rod 24. The pin or bolt 28 extends forwardly through the disk 27, and is provided in its forward end with a slot 29 for the reception and retention of one end of the igniting wire 30, which is convolute and of any suitable material, and has its other end secured in the slot 31 of a metallic post 32 which is extended through the disk 27 so as to project beyond each of its surfaces and so that its inner portion may be in position to be impinged against or contacted with by the contact spring 21 when pressure is applied to the push button 20 of the cup 19.

Located within the igniter carrying cup 26 is a disk or plate 33, of lavite or other suitable material, which is formed with a central opening for the reception of the pin or bolt 28 and also with an opening near its periphery, through which is extended the front portion of the post 32, which portion, as before stated, is slotted and holds one end of the igniting wire. The plate or disk 33 is provided with an annular flange 34, which extends outwardly within the cup 26, and said disk has on its front surface a number of radially disposed ribs 35 to assist in supporting the wire 30 and to form air chambers. These ribs are slightly narrower than the flange 34, thus allowing the wire 30 to rest on their outer edges, yet to lie within the compartment formed by said flange. Resting on the flange 34 and externally of the wire 30 is a perforated disk, of mica or other suitable material, 36, over which is laid a perforated disk 37, of very thin steel, the perforations of which register with those of the disk 36, of mica. The steel or metallic disk 37 is employed to protect the mica disk in the operation of lighting cigars, thus rendering it more durable.

From the foregoing and by reference to the drawing it will be seen and clearly understood that when the parts are assembled as above described and the conductors 18 are in electric communication with a generator, by pressing on the push button 20 the contact spring will be forced into contact with the post 32, thus completing the circuit so that the wire 30 will become heated to a high degree, when by applying the end of a cigar to the perforated plate 37, it may be ignited.

In order to convert the device so that it may be used as an illuminant, the cups 19 and 26 are removed from the socket 15, when an electric bulb 38, of the ordinary or any preferred construction, may be screwed into the socket 15 in lieu of the stem 24 of the outer cup, when the circuit will be completed in a well known way and a lamp thereby provided.

The bulb 38 may be provided with a reflector 39, of any suitable size and material, which is preferably located around the neck of the bulb, as is shown in Fig. 5 of the drawing. The disk 37 may be held in place within the cup 26 by means of an annular washer 40, or otherwise.

It will be obvious from the above description that by constructing a device according to our invention, a very simple and effective apparatus is afforded for use as a cigar lighter in strong winds or during the rapid progress of an automobile, or otherwise, or as a lamp in a portable and handy form, and it is also apparent that the apparatus is susceptible of considerable modification without material departure from the principles and spirit of the invention, and for this reason we do not desire to be understood as limiting ourselves to the precise form and arrangement of the several parts herein set forth in carrying out our invention in practice.

Having thus fully described our invention, what we claim as new, and desire to secure by Letters-Patent, is—

1. In an electric lighting device, the combination with a hollow hand-piece, of a metallic socket and a terminal located in one end thereof, conductors extending into the hand-piece and electrically connected at one of their ends to said terminal and socket and in communication with an electric supply, a removable cup having a stem consisting of a socketed central rod or piece adapted to contact with said terminal, insulating material surrounding said rod and a screw-threaded tubular metallic portion surrounding said insulating material and adapted to engage said first-named socket, a contact spring located in said cup, a push-button extended through the wall of the cup to co-act with said spring, an igniter-carrying-cup removably located in the first-named cup and having means centrally located therein to engage the socket of the stem of the first-named cup, a post located in the igniter-cup near the aforesaid contact spring, and an igniting wire secured at one of its ends to said post and electrically connected at its other end to said centrally located means.

2. In an electric lighting device, the combination with a hollow hand-piece, of a metallic socket and a terminal located in one end thereof, conductors extending into the hand-piece and electrically connected at one of their ends to said terminal and socket and in communication with an electric supply, a removable cup having a stem consisting of a socketed central rod or piece adapted to contact with said terminal, insulating material surrounding said rod and a screw-threaded tubular metallic portion surrounding said insulating material and adapted to engage said first-named socket, a contact spring located in said cup, a push-button extended through the wall of the cup to co-act with said spring, an igniter-carrying-cup removably located in the first-named cup and having means centrally located therein to engage the socket of the stem of the first-named cup, a post located in the igniter-cup near the aforesaid contact spring, an igniting wire secured at one of its ends to said post and electrically connected at its other end to said centrally located means, and a perforated disk of mica located and supported externally of said wire.

3. In an electric lighting device, the combination with a hollow hand-piece, of a metallic socket and a terminal located in one end thereof, conductors extending into the hand-piece and electrically connected at one of their ends to said terminal and socket and in communication with an electric supply, a removable cup having a stem consisting of a socketed central rod or piece adapted to contact with said terminal, insulating material surrounding said rod and a screw-threaded tubular metallic portion surrounding said insulating material and adapted to engage said first-named socket, a contact spring located in said cup, a push-button extended through the wall of the cup to co-act with said spring, an igniter-carrying-cup removably located in the first-named cup and having means centrally located therein to engage the socket of the stem of the first-named cup, a post located in the igniter-cup near the aforesaid contact spring, an igniting wire secured at one of its ends to said post and electrically connected at its other end to said centrally located means, a perforated disk of mica located and supported externally of said wire, and a perforated disk of steel located externally of the mica disk and having its perforations in register with those of the mica disk.

4. In an electric lighting device, the combination with a hollow hand-piece, of a metallic socket and a terminal located in one end thereof, conductors extending into the hand piece and electrically connected at one of their ends to said terminal and socket and in communication with an electric supply, a removable cup having a stem consisting of a socketed central rod or piece adapted to contact with said terminal, insulating material surrounding said rod and a screw-threaded tubular metallic portion surrounding said insulating material and adapted to engage said first-named socket, a contact spring located in said cup, a push-button extended through the wall of the cup to co-act with said spring, an igniter-carrying-cup having a bottom and wall of lavite located in the first-named cup and provided with means centrally located therein to engage the socket in the stem of the first-named cup, radially disposed ribs in said lavite portion, a post located in the bottom of the igniter-cup near the aforesaid contact spring, and a wire secured at one of its ends to said post and electrically connected at its other end to said centrally located means.

ANTONE M. CORNELIUS.
WILLOUGHBY V. CHAMPLIN.

Witnesses:—
   CHAS. C. TILLMAN,
   M. A. NYMAN.